(12) United States Patent
Dugan et al.

(10) Patent No.: US 9,089,812 B2
(45) Date of Patent: Jul. 28, 2015

(54) PROCESS VESSELS AND PLANT FOR GAS CAPTURE

(75) Inventors: Craig Dugan, Park Orchards (AU); Trina Margaret Dreher, Beaumaris (AU)

(73) Assignee: Process Group Pty. Ltd., Rowville (AU)

(*) Notice: Subject to any disclaimer, the term of this patent is extended or adjusted under 35 U.S.C. 154(b) by 1071 days.

(21) Appl. No.: 13/102,470

(22) Filed: May 6, 2011

(65) Prior Publication Data

US 2011/0232494 A1 Sep. 29, 2011

Related U.S. Application Data

(63) Continuation-in-part of application No. PCT/AU2009/001470, filed on Nov. 10, 2009.

(30) Foreign Application Priority Data

Nov. 10, 2008 (AU) .................................. 2008905799

(51) Int. Cl.
*B01D 53/18* (2006.01)

(52) U.S. Cl.
CPC .......... *B01D 53/18* (2013.01); *B01D 2257/504* (2013.01); *Y02C 10/06* (2013.01)

(58) Field of Classification Search
None
See application file for complete search history.

(56) References Cited

U.S. PATENT DOCUMENTS

| | | | | |
|---|---|---|---|---|
| 3,791,102 A | * | 2/1974 | Huntington | 95/191 |
| 3,929,188 A | | 12/1975 | Brinkmann et al. | |
| 4,147,523 A | * | 4/1979 | Izumo | 96/126 |
| 4,158,702 A | | 6/1979 | Archer | |
| 4,369,167 A | * | 1/1983 | Weir, Jr. | 423/210 |
| 5,221,304 A | * | 6/1993 | Garrett et al. | 96/108 |
| 2005/0072299 A1 | * | 4/2005 | Thomas | 95/226 |
| 2006/0185320 A1 | | 8/2006 | Dureiko et al. | |
| 2010/0186591 A1 | * | 7/2010 | Skovholt et al. | 95/183 |
| 2011/0296994 A1 | * | 12/2011 | Stevens et al. | 95/236 |

OTHER PUBLICATIONS

International Search Report, for PCT/AU2009/001470, mailed Dec. 18, 2009, five (5) pages.

* cited by examiner

*Primary Examiner* — Duane Smith
*Assistant Examiner* — Cabrena Holeck
(74) *Attorney, Agent, or Firm* — Francis J. Maguire; Ware Fressola Maguire & Barber LLP

(57) ABSTRACT

A gas scrubbing apparatus including at least two modules, each module including at least one process vessel for a gas scrubbing process, each process vessel being selected from an absorber, a regenerator, a scrubber, a reboiler, a heat exchanger or a combination thereof. Each process vessel has top wall, a base wall, and at least three sidewalls formed from a cementitous material. Each process vessel has inlet and outlet ports for fluid entering and leaving the process vessel when in use, formed within at least one of the top wall, base wall, or sidewall of each process vessel. The sidewalls of each process vessel define a polygon shaped cross-section, and at least one side wall of a first process vessel in a first module can be connected or abutted to at least one side wall of a second process vessel in a second module.

15 Claims, 5 Drawing Sheets

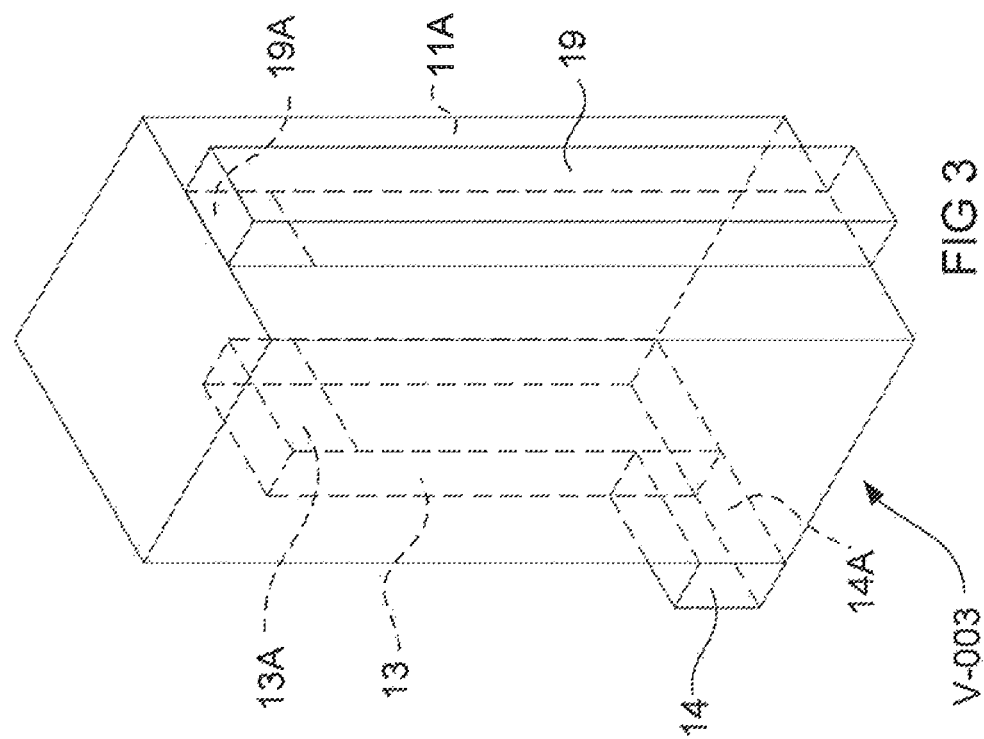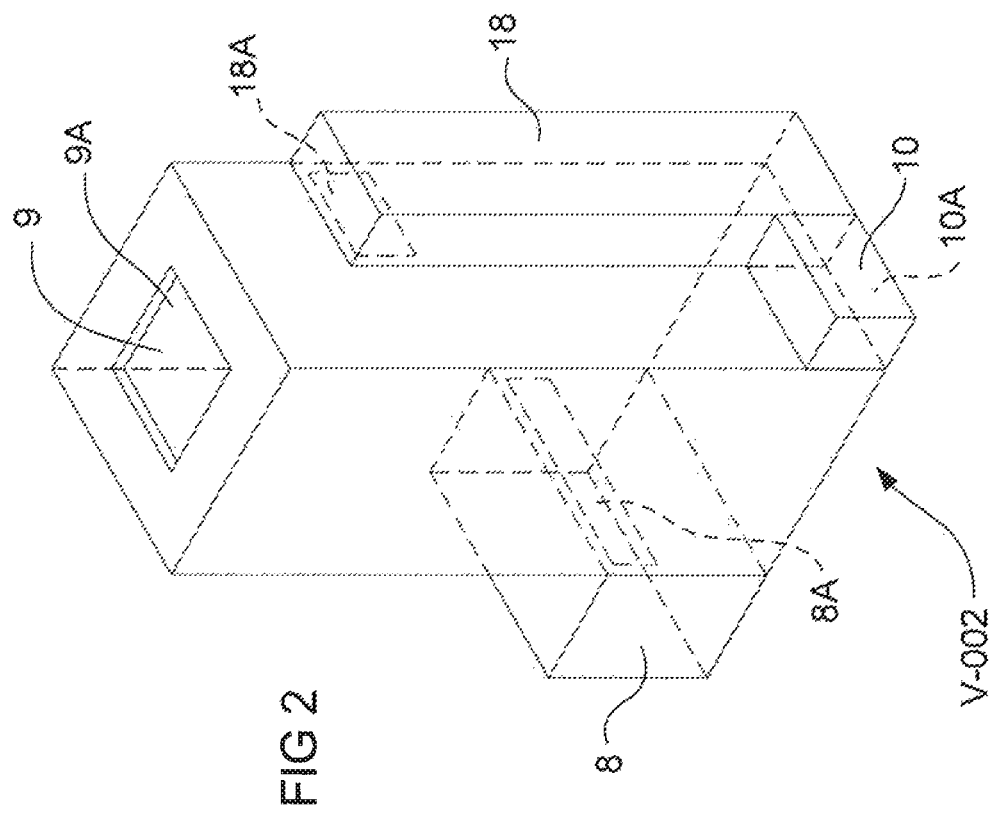

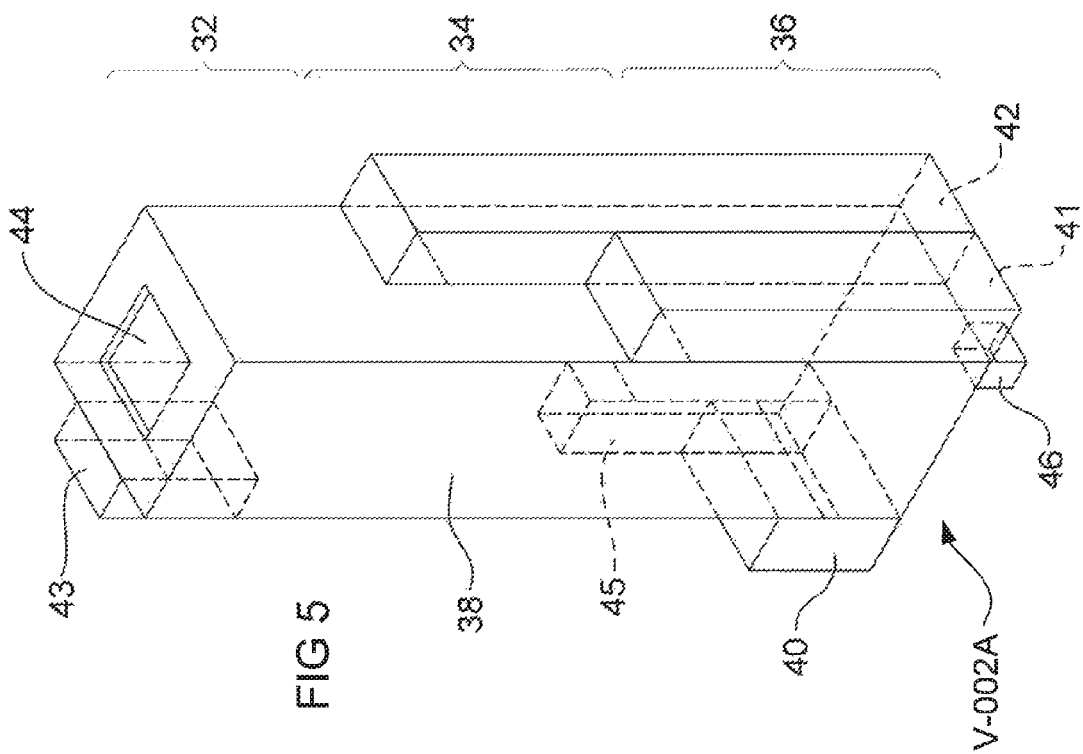
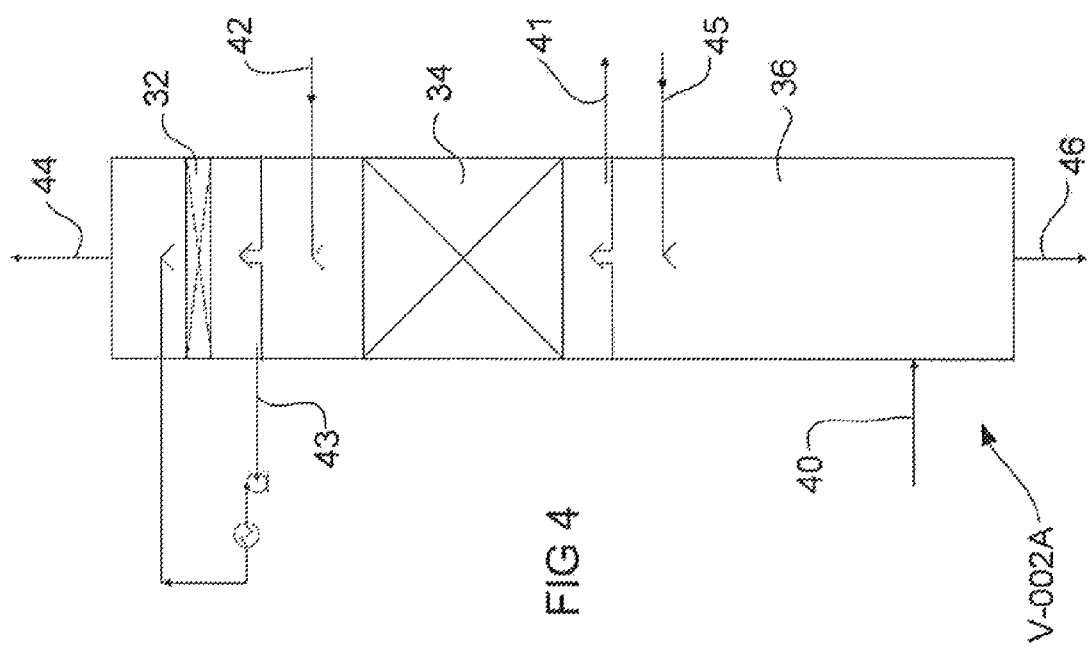

PROCESS VESSELS AND PLANT FOR GAS CAPTURE

FIELD OF THE INVENTION

The present invention generally relates to process vessels for gas absorption and solvent regeneration and a process plant which utilises these vessels. The invention is particularly applicable for a process of removing carbon dioxide from gas mixtures such as post combustion gases produced from power generating processes and it will be convenient to hereinafter disclose the invention in relation to that exemplary application. However, it is to be appreciated that the invention is not limited to that application and could be used in any similar solvent based absorption and regeneration process.

BACKGROUND TO THE INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

Gas scrubbing is one method of reducing industrially produced carbon dioxide. The most widely used gas scrubbing process involves scrubbing of a gas using an absorption medium, typically an aqueous alkaline solvent solution. The process is regenerative through the continuous recirculation of the absorption medium between an absorption stage where carbon dioxide is absorbed into the absorption medium and a regeneration stage in which carbon dioxide is desorbed from the absorption medium.

The combustion gas produced from bulk combustion processes such as coal or gas-fired power stations require large scale gas scrubbing plants to process the emissions. The overall size that traditional welded metal framework process vessels can be constructed for this purpose is limited by transport and structural strength considerations. In this respect, road transport regulations in many countries place a limit on the size (height and width) of loads which can be transported. In addition, most vessels of this type are transported on their sides due to height restrictions of overhead structures (bridges, powerlines etc.) Wall strength considerations therefore limit the size of a vessel that can be transported in this manner. Such process vessel size restrictions limit the economic viability of constructing large scale plants that include large scale process vessels.

U.S. Pat. No. 5,221,304 discloses a pressure swing adsorption vessel containing a bed of absorbent configured to address some of the above size restriction issues. The vessel is constructed with a top and base having gas distribution ports formed therein and having sidewalls of concrete which are lined with a gas and moisture-impermeable material. The vessel is designed to be constructed and located underground. However, the construction and configuration of this vessel is not ideally suited to combustion gas scrubbing applications.

It is therefore desirable to provide alternative process vessels and a process plant using these vessels for gas scrubbing of post combustion gas streams.

SUMMARY OF THE INVENTION

According to the present invention, there is provided a gas scrubbing apparatus including:
at least two modules, each module including at least one process vessel for a gas scrubbing process, each process vessel being selected from an absorber, a regenerator, a scrubber, a reboiler, a heat exchanger or a combination thereof,
each process vessel having top wall, a base wall, and at least three sidewalls formed from a cementitous material,
each process vessel having inlet and outlet ports for fluid entering and leaving the process vessel when in use, formed within at least one of the top wall, base wall, or sidewall of each vessel,
wherein the sidewalls of each process vessel define a polygon shaped cross-section,
and wherein at least one side wall of a first process vessel in a first module can be connected or abutted to at least one side wall of a second process vessel in a second module.

The present invention provides a gas scrubbing apparatus having modules which include various process vessel or vessels for a gas scrubbing process that are formed from a cementitious material, such as concrete. Constructing this type of vessel from a cementitious material allows the vessel to be fabricated using existing concrete building construction techniques. For example, a vessel of this type can be constructed using precast cementitous sections and/or panels, cast-in-place techniques or other construction techniques used in the concrete construction industry. This makes such a process vessel relatively easy to manufacture on-site as compared to traditional factory based metal fabrication techniques used to construct metal process vessels.

For the purposes of the present invention, a cementitious material is generally any material having cementing properties which contributes to the formation of hydrated calcium silicate compounds. Suitable materials having cementitious properties include portland cement, blended hydraulic cement, fly ash, ground granulated blast furnace slag, silica fume, calcined clay, meta kaolin, calcined shale, rice husk ash and geopolymer materials such as aluminosilicate materials, mineral polymers, ceramic and refractory materials, and concrete materials. Preferably, the cementitious material is concrete or a geopolymer such as E-Crete™ produced by Geobond Pty Ltd in Melbourne, Australia.

The cementitious material is preferably reinforced. Suitable reinforcement includes steel structures such as grill, beams, framework or similar, carbon fibre, reinforcement mesh, reinforcement fabric or the like. In some forms the cementitious material has internal stiffening members or a reinforcement structure to help bind the material to itself and prevent cracking. Additionally or alternatively, the cementitious material can include any number of additives or treatments to enhance the properties of the material. For example, additives can be mixed into the cementitous material mix to enhance the chemical resistance of the material.

The polygon shaped cross-section of the process vessel provides the vessel with flat sides. The flat sides also facilitate fabrication of the vessel using existing concrete building construction techniques. In a preferred form, the sidewalls of the vessel form a rectangular or square cross-section. The use of four sided vessels provides flexibility in placement and arrangement of various vessels in a plant that includes these vessels.

The sidewalls of a process vessel typically define at least one chamber within the vessel. In some process vessels such as regenerators and absorbers, the chamber can contain packing material and/or trays. The packing material can be a solid substrate that may be either one of a) an absorbing medium either as a fixed bed or a moving bed, or alternatively b) a substantially inert substrate, conventionally called packing that facilitates contact between a liquid absorbent and the gas stream. In other process vessels such as heat exchangers and reboilers, the chamber may include one or more heat transfer elements such as plates and/or pipes. In one embodiment, the heat exchange elements are corrugated plates.

The process vessels are generally configured in accordance with the typical orientation used for that particular type of vessel. For example, certain heat exchanger units, reboilers, are preferably orientated as horizontal process vessels. Conversely, gas scrubbers, regenerator and absorber process vessels are preferably orientated as vertically extending columns. Vertically extending columns of this type according to the present invention can be constructed using construction techniques presently used for high rise buildings. For example, a reinforced concrete based vertical column could be constructed using a cast-in-place method in which the outer shell of the column is vertically cast in place in stages.

The inlet ports, outlet ports and other connection sections are preferably formed from and/or within the same cementitous material forming the shell or body of the process vessel. Similarly, it is preferred for the fluid conduits connected to the inlet and outlet ports of the process vessel to be integrally formed with at least one of the top wall, base wall, or sidewall of the vessel. For example, air ducts and fluid conduits connected to inlet and outlet ports could be cast in place or formed from a precast cementitous material section or sections which are built or otherwise formed with the body of the process vessel. These types of fluid conduits would preferably comprise vertically or horizontally hollow bodies formed with the respective top wall, base wall, or sidewall of the vessel.

Process vessels of the gas scrubbing apparatus according to the present invention will typically not require lining. However, cementitous material can be porous in some forms, and/or can be damaged through reaction or other processes by certain fluids and/or conditions used within the vessel. In these applications, the interior of the process vessel could be lined in a fluid-tight manner with a moisture- and gas-impermeable lining. The moisture- and gas-impermeable lining is preferably selected from rubber, plastic, polymeric coating, metal or a combination thereof. In some forms, the lining is also used to provide structural strength to the process vessel.

The process vessels in the modules of the gas scrubbing apparatus according to the present invention may be of any size and ultimately the gas flow rate that can be handled may be of any magnitude. Consequently, the cross-sectional areas of the process vessels will be a function of the flow rate of the gas to be treated, the flow rate of the liquid absorbent and the desired velocity of the fluids in the chambers. In this respect, in some embodiments, the process vessel is used in a gas scrubbing process which scrubs carbon dioxide from flue gas of a coal fired power station generating in the range of 100 to 500 MW. In these embodiments, the process vessels are preferably sized to treat at least 1000 t/hr, and suitably greater than 2000 or 3000 t/hr of the gas. Similarly, when the process vessel is a regenerator or absorber, it is preferred for the process vessel to be able to process and treat at least 6000 t/hr and preferably greater than 18000 t/hr liquid absorbent. Given the large quantities of fluid treated, it is expected that the process vessel will be at least 10 m wide and at least 30 m in height in some embodiments.

These process vessels are preferably designed to be able to withstand the pressure regime to which it is subjected when in use. Preferably, the process vessels of the of the gas scrubbing apparatus of the present invention is built for applications in which the pressure does not exceed about 5 atmospheres absolute, preferably 2 atmospheres absolute. More preferably, the process vessel is built to operate at around atmospheric pressure.

The base is preferably supported by suitable slab, footing, pillars or like members. The top and sides may be provided with manways to allow access to be gained to the interior of the finished process vessel.

The process vessels are preferably constructed and fabricated on the site of their use of a size which would not be able or be permitted to be transported by road. The vessels are located in an above ground location, preferably either seated on or near the ground or raised on a support structure at a height above the ground.

The gas scrubbing apparatus according to the present invention can include one module, two modules or more depending on the gas load the apparatus is required to treat. Each module can include one or more of an absorber, a regenerator, a scrubber, a reboiler, a heat exchanger or a combination thereof. In some embodiments, each module includes at least one absorber and at least one regenerator.

In this type of gas scrubbing apparatus, the gas stream passes through the absorber contacting an absorption medium in the absorber which extracts carbon dioxide from the gas stream thereby producing a gas stream relatively lean in carbon dioxide and an absorption medium loaded with carbon dioxide. The regenerator strips the absorbed carbon dioxide from the absorption medium to produce a gas stream rich in the extracted gas and an absorption medium lean in that gas. The gas scrubbing apparatus is preferably for carbon dioxide capture from boiler or turbine flue gas but may be used for carbon or other gas capture from other process streams.

The process vessel(s) of each module may be of any diameter and ultimately the gas flow rate that can be handled may be of any magnitude. However, in the situation where the gas scrubbing apparatus is used in a gas scrubbing process which scrubs carbon dioxide from flue gas of a coal fired power station generating in the range of 100 to 500 MW. Each process vessel is preferably sized to treat a fraction of at least 1000 t/hr, and suitably greater than 2000 or 3000 t/hr of the gas. That fraction will depend on the number of process vessels, such as absorbers and regenerators in that gas scrubbing apparatus. Similarly, each process vessel is preferably sized to treat a fraction of at least 6000 t/hr and preferably greater than 18000 t/hr liquid absorbent used in the gas scrubbing apparatus.

Each module of the gas scrubbing apparatus is preferably arranged in a space saving manner. Space savings can be made in some instances by forming the respective connected or abutting side wall of the respective process vessel in a module as a substantially planar surface. Preferably, the sidewalls of each of the process vessels define a polygon shaped cross-section such as a rectangular or square cross-section. This configuration allows each of these process vessels to be arranged in close proximity and more preferably in abutting proximity to each other within a module.

Again, the inlet ports, outlet ports, the fluid conduits connected to the inlet and outlet ports of the process vessel and other connection sections are preferably formed from and/or within the same material forming the shell or body of the process vessel. Preferably, the fluid conduits are positioned on the outer walls and/or through the respective connected or abutting side walls of the respective process vessel in a module.

Certain fluid conduits of each module are preferably configured to fluidly connect with the associated fluid conduits of an adjoining module to form a common fluid conduit. This enables adjacent modules to be easily interconnected within the gas scrubbing apparatus to form a larger unit having common inlet and outlets.

At least one inlet or outlet, preferably each inlet and outlet of the process vessels in a module can include a sealing device to substantially close that inlet or outlet. The sealing device can comprise at least one of a gate valve or butterfly valve. The sealing device enables particular modules and/or process vessels to be taken in or out of circuit within the gas scrubbing apparatus in order to accommodate any gas feed variations that may result, for example, when the combustion gas exhaust load from a coal-fired power station varies between peak electricity load periods and off-peak periods.

Each module can include further process equipment. For example, each module can further include at least one absorber, regenerator, scrubber, reboiler or heat exchanger. Furthermore, such further process equipment can be incorporated into the configuration of an absorber or regenerator. For example, the absorber can include at least one gas scrubber stage.

Some modules can further include at least one heat exchanger in fluid communication with at least one of the regenerator or the absorber, the heat exchanger being located under the base of the respective regenerator or absorber. This locates the heat exchanger below each of the fluidly connected process vessels, allowing the fluid feed to the heat exchanger to be either pumped or gravity fed from the fluidly connected process vessels. The heat exchanger can be any suitable type of heat exchanger capable of handling two liquid streams such as a plate heat exchanger or a shell and tube heat exchanger. Preferably, the heat exchanger comprises a countercurrent plate heat exchanger. Preferably, the housing of the heat exchanger is formed from a cementitious material. Again, the inlet ports, outlet ports, the fluid conduits connected to the inlet and outlet ports of the process vessel and other connection sections are preferably formed from and/or within the same material forming the shell or body of the heat exchanger vessel. In some embodiments, the heat exchanger includes corrugated heat exchanger plates. The heat exchanger plates are typically made of metal. The corrugations of each plate are preferably arranged at an angle to an adjoining plate. In some embodiments, the corrugations can be arranged between 60 to 150° relative to the adjoining plate, more preferably 90°.

Each module can include at least one pump or pump bank. The pump bank preferably comprises a bank of two or more pumps connected in parallel. Each pump can be individually controlled and operated to provide a desired pump rate. Accordingly, if a large flow is required to be pumped, all the pumps can be operated. If a small flow is required to be pumped, only a fraction of the total number of pumps can be operated. This pump bank arrangement provides flexibility in the overall output of the pump bank. The pump bank arrangement also allows for a number of small pumps to be utilised to provide a large pumping power as opposed to using purpose built large capacity pumps.

The gas scrubbing apparatus according to the present invention preferably treats a post combustion gas stream. These types of gas streams are typically low pressure exhaust or flue gas streams from combustion processes such as a gas turbine power station, coal fired power stations or the like. In one preferred embodiment, the post combustion gas stream is an exhaust stream from a gas turbine in which natural gas and air are introduced into a heat engine.

According to a further aspect of the present invention, there is provided a plant for removing carbon dioxide from a post combustion gas stream including a gas scrubbing apparatus according to the present invention.

The plant of the present invention may also include any one or a combination of the features of the process of the present invention described above including:

specific operating temperature and pressure ranges for the absorber and regenerator;

cyclone separators for removing particles or other co-current or countercurrent gas liquid contactors into which the gas stream and the absorption medium are fed and come into contact such that heat can be directly transferred therebetween;

the absorption of contaminants including sulphur and nitrogen containing compounds from the gas stream during the direct transfer of heat to the absorption medium; or heat exchanger networks including exchangers and/or heat pumps for directly and indirectly transferring heat between process streams. These streams can be gaseous and/or liquid streams.

The particular operating temperatures and pressures of the absorber and the regenerator have a substantial impact on the amount of useful heat that can be transferred between process streams. It should however be appreciated that optimal operating conditions may ultimately depend on heat integration considerations from other unit operations contained within the overall processing plant into which the process and plant according to the present invention is incorporated.

BRIEF DESCRIPTION OF THE DRAWINGS

The present invention will now be described with reference to the Figures of the accompanying drawings, which illustrate particular preferred embodiments of the present invention, wherein:

FIG. 2 is a perspective view of an absorber tower according to a preferred embodiment of the present invention.

FIG. 3 is a perspective view of a regenerator tower according to a preferred embodiment of the present invention.

FIG. 4 is a schematic diagram of a scrubber and absorber tower.

FIG. 5 is a perspective view of a scrubber and absorber tower according to a preferred embodiment of the present invention.

DETAILED DESCRIPTION

Figure 1:
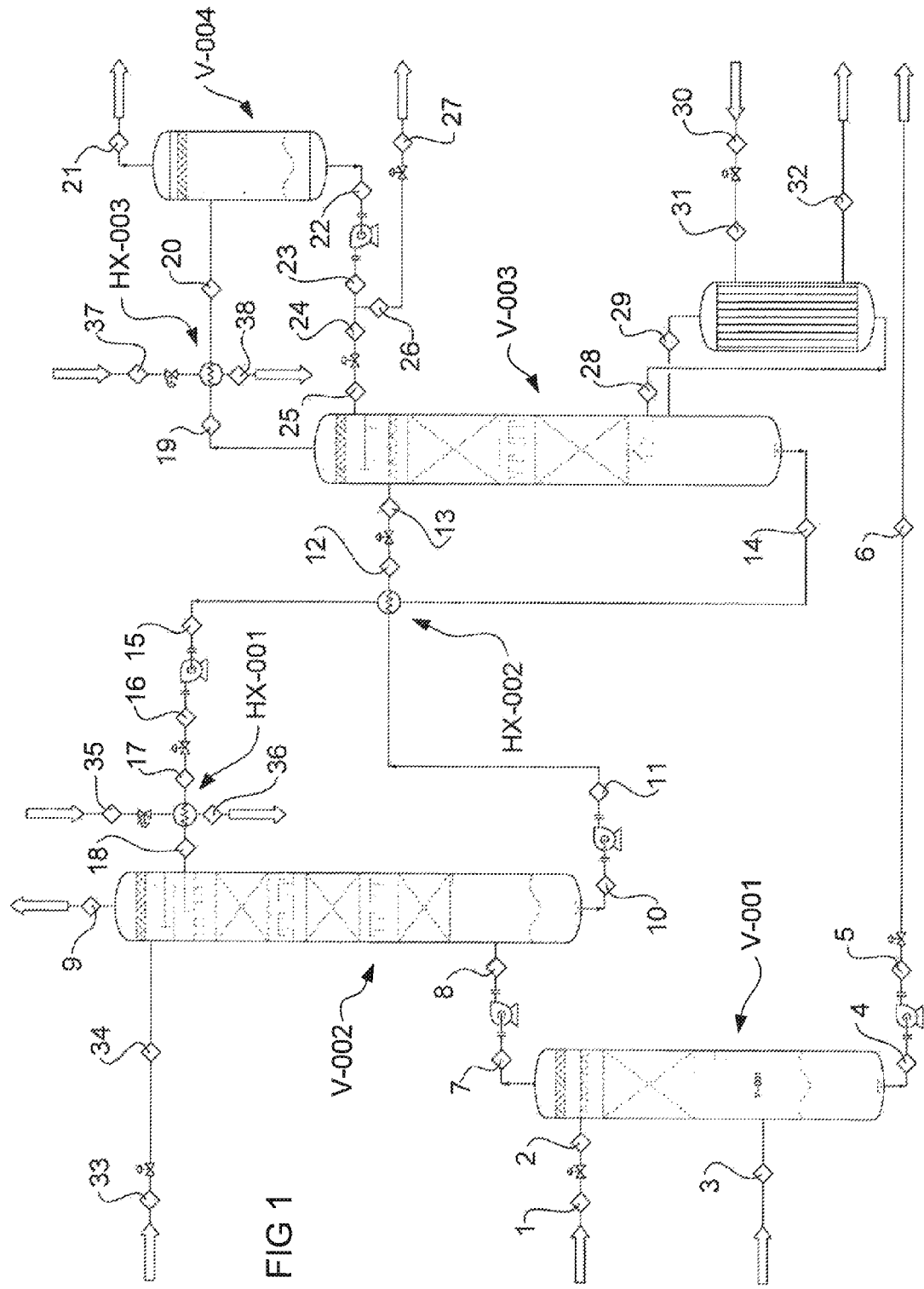
FIG. 1 is general flow diagram for an existing process for the removal of carbon dioxide from the post-combustion exhaust stream of a power generating process.

Referring firstly to FIG. 1, there is shown a general process flow diagram for a solvent absorption system for the removal of carbon dioxide from a post combustion exhaust stream, such as a gas turbine or boiler (not illustrated). Broadly, the illustrated removal process involves scrubbing of a carbon dioxide rich gas feed stream 3 using an absorption medium (also termed "solvent"), in this case an aqueous alkaline scrubbing solution. The process is regenerative and involves the continuous recirculation of the absorption medium between an absorption stage which is carried out in absorber tower V-002 where carbon dioxide is absorbed into the absorption medium, and a regeneration stage which is carried out in a regenerator tower V-003 where carbon dioxide is desorbed from the absorption medium thereby regenerating the absorption medium.

Following the process stream through the various units, it can be seen that a carbon dioxide rich gas feed stream 3 is fed into a scrubber vessel V-001 in which the gas is cooled through the application of cooling water 2. The cooled gas stream 7 is then fed to the absorber tower V-002 using a blower B-001.

The illustrated absorber tower V-002 is a packed column containing trays and/or packing material. The $CO_2$ rich exhaust gas from stream 8 enters the absorber tower V-002 at an inlet located near the bottom of absorber tower V-002 and rises through the internal packing. Absorption medium lean in $CO_2$ enters the absorber tower V-002 from an inlet located near the top of the absorber tower V-002 and cascades downwardly through the internal packing. As the exhaust gas rises through the absorber tower V-002 the carbon dioxide content of the gas is progressively absorbed by the absorption medium. The resulting exhaust gas 9 is virtually free of $CO_2$ and is vented from the upper gas outlet of the absorber tower V-002 via gas exit stream 9. A $CO_2$-rich absorption medium is produced at the bottom solvent exit stream 10 of the absorber tower V-002.

The $CO_2$-rich absorption medium is pumped through a heat exchanger HX-002 which transfers energy from exit stream 14 from the regenerator tower V-003 to pre-heat the rich absorption medium exiting the absorber tower V-002 before the absorption medium is fed into the regenerator tower V-003.

The absorption medium enters the regenerator tower V-003 via an inlet stream 13 connected near the top of the regenerator tower V-003. The illustrated regenerator tower V-003 is a packed column containing trays and/or packing material. The absorption medium cascades down through the regenerator tower V-003. In the regenerator tower V-003 the absorption medium is heated in reboiler HX-004 to reverse the absorption reaction. As the absorption medium cascades down through the regenerator tower V-003, carbon dioxide is gradually desorbed from the absorption medium. A stream of the absorption medium solution 14 lean in carbon dioxide is discharged from the base of the regenerator tower V-003 and recycled to the absorber tower V-002 where it is again contacted with the $CO_2$-rich feed gas 8.

The desorbed $CO_2$ exits the regenerator tower V-003 via an upper exit stream 19 as a substantially pure, water saturated $CO_2$ gas. This $CO_2$ stream 19 can then be cooled in a condenser HX-003 and passed through a reflux accumulator V-004 to remove condensed water. The pure carbon dioxide product gas is then ready for direct use or further processing. The condensed water stream may, in part, or in its entirety, be returned to the process.

Referring now to FIGS. 2 and 3, there is shown an absorber tower V-002 (FIG. 2) and a regenerator tower V-003 (FIG. 3) according to one embodiment of the present invention. The absorber tower V-002 and regenerator tower V-003 could be used as the equivalent process vessels in the process shown in FIG. 1. Accordingly, the same reference numerals have been used in FIGS. 2 and 3 for the process vessels, and associated inlet and outlet conduits as used in FIG. 1.

The illustrated process vessels V-002 and V-003 are a large scale regenerator tower V-003 and a large scale absorber tower V-002 having a height of more than 30 m and a width of more than 10 m. The vessels are designed to be used in a gas scrubbing process which scrubs carbon dioxide from flue gas of a coal fired power station generating in the range of 100 to 500 MW which treats a gas load of greater than 1000 t/hr and is able to process and treat at least 6000 t/hr of liquid absorbent. For example, the approximate required mass flow rate of flue gas of a 500 MW coal-fired power station to be scrubbed is in the order of 5000 t/hr. It should however be appreciated that the solvent (absorption medium) flow will be dependent on the particular solvent used in the process.

Each of the regenerator tower V-003 and absorber tower V-002 comprise flat-sided, square or rectangular columns for use with a solvent absorption system such as is shown in FIG. 1. The illustrated columns are constructed from a cementitious material such as concrete or a geopolymer (for example E-Crete™ produced by Geobond Pty Ltd in Melbourne, Australia). As shown, the main body or shell 11A, 12A of each process vessel V-003, V-002 respectively comprise a square or rectangular cross-section column. The body 11A, 12A of each vessel V-003, V-002 respectively has four flat sides. The flat-sided, square or rectangular column configurations lend the vessels V-002, V-003 to construction techniques used in the concrete building industry. Accordingly, the regenerator tower V-003 and absorber tower V-002 can be fabricated from pre-cast panels or using cast in-place techniques. The regenerator tower V-003 and absorber tower V-002 can be constructed using these techniques as a free standing vessel or be constructed with a common wall with an adjoining column of the same or a different type, e.g. absorber/regenerator, absorber/absorber, regenerator/regenerator.

Fixed channels 8, 10, 13, 14, 18, and 19 are integrated into various sides and tops of each process vessel V-002, V-003 for the transfer of process fluids. The inlet ports 8A, 13A, 18A, and outlet ports 9A, 10A and 14A and other connection ports (not illustrated) are formed within the same cementitious material forming the main body 11A, 12A of the process vessels V-002, V-003. For example, for the regenerator tower V-003 shown in FIG. 3, the main body 11A includes a $CO_2$ rich solvent inlet conduit 13, leading to solvent inlet port 13A comprising a square or rectangular opening in the main body 11A. The main body 11A also includes lean solvent outlet port 14A and associated conduit 14, and gas outlet 19A and associated conduit 19. Absorber tower V-002 includes a $CO_2$ rich solvent outlet 10A and associated conduit 10, a gas inlet 8A and associated conduit 8, a lean solvent inlet 18A and associated conduit 18, and a gas outlet 9A which comprises a vent opening 9 in the top end of the vessel V-002. The vent opening 9 at top of the absorber tower V-002 is configured to be open to atmosphere and is designed such that contaminants do not enter the system through the vent opening 9. This vent opening 9 can therefore be provided with a screen, shield or other type of cover (not shown) to substantially prevent contaminants entering the system through the opening 9.

The process vessels V-002, V-003 may have an internal coating of rubber, plastic, polymeric coating, or metal to improve chemical or physical resistance. Additionally, the cementitious structure can include suitable reinforcement such as grills, beams, framework or similar, carbon fibre, reinforcement mesh, reinforcement fabric or the like.

Each of the regenerator tower V-003 and the absorber tower V-002 are configured to include column gas pressures of near atmospheric. Of course, the maximum pressure handled by any one configuration of vessel of this type will be limited by the design pressure of the concrete and reinforcement structure contained therein. Similarly, the process fluid temperature limit will also be determined by the materials of construction.

The regenerator tower V-003 and the absorber tower V-002 are usually constructed in an elevated position, or have a cavity excavated underneath the vessel V-002 or V-003 in which pumps (not shown) and heat exchangers (for example heat exchanger 60 shown in FIG. 7) located below the base of each process vessel V-002, V-003.

In operation, solvent from the regenerator tower V-003 flows into a lean/rich cross-exchanger (not shown) from outlet 14A under gravity. Similarly, solvent from the absorber tower V-002 may flow into a lean/rich cross-exchanger (not shown) from outlet 10A under gravity or directly into a pump (not shown).

The regenerator tower V-003 and the absorber tower V-002 would be designed for use with any absorption medium. The absorption medium can be any suitable regenerative medium capable of absorbing carbon dioxide from a gaseous stream such as a solution containing nitrogen compounds for example amino acids, a range of amines such as monoethanolamine (MEA) or a combination thereof and solutions containing an alkali carbonate such as potassium carbonate or sodium carbonate. The solution can include activators or promoters used to enhance absorption kinetics, and reduce degradation rates and corrosiveness.

FIGS. 4 and 5 illustrate a combined scrubber and absorber column V-002A according to one preferred embodiment of the present invention. FIG. 4 is a schematic diagram of the vessel V-002A and FIG. 5 is a perspective view of the actual vessel V-002A. It should be appreciated that the same numerals have been used to represent like parts in the vessel V-002A shown in FIGS. 4 and 5. This process vessel V-002A could be used to replace vessels V-001 and V-002 in the process shown in FIG. 1. This type of combined scrubber/absorber column is sometimes used in solvent systems such as the CANSOLV® process.

The illustrated scrubber and absorber column V-002A includes three sections, being:
 a wash section 32 comprising a packed section in which water is sprayed into a packed bed to wash any gas rising through the packing, where the water wash may be once-through or recycled, the wash section 32 being optional, and being generally only used for certain solvents;
 an absorber section 34 comprising a packed section in which an absorption medium, typically a solvent is sprayed onto the packing and moves through the packing contacting $CO_2$ rich gas rising through the packing thereby absorbing the $CO_2$ content of the gas; and
 a scrubber section 36 which may be a spray or packed tower. In this section 36, water is sprayed onto a $CO_2$ rich gas feed in the section to cool this gas stream.

Like the regenerator tower V-003 and absorber tower V-002 described above, this vessel V-002A comprise flat-sided, square or rectangular columns for use with a solvent absorption system such as is shown in FIG. 1. Again, the column can be constructed from a cementitious material such as concrete or a geopolymer (for example E-Crete™ produced by Geobond Pty Ltd in Melbourne, Australia).

The main body or shell 38 of the process vessel V-002A comprises a square or rectangular cross-section column having four flat sides. Fixed channels 40, 41, 42, 43, 45 and 46 are integrated into various sides and tops of the vessel V-002A for the transfer of process fluids. The corresponding inlet/outlet ports for the channels 40, 41, 42, 43, 45 and 46 are formed within the same cementitious material forming the main body 38 of the vessel V-002A. The top vent 44 comprises an opening in the top end of the vessel V-002A.

Again, this process vessel V-002A may have an internal coating of rubber, plastic, polymeric coating, or metal to improve chemical or physical resistance. Additionally, the cementitous structure can include suitable reinforcement includes such as grills, beams, framework or similar, carbon fibre, reinforcement mesh, reinforcement fabric or the like.

Figure 6:
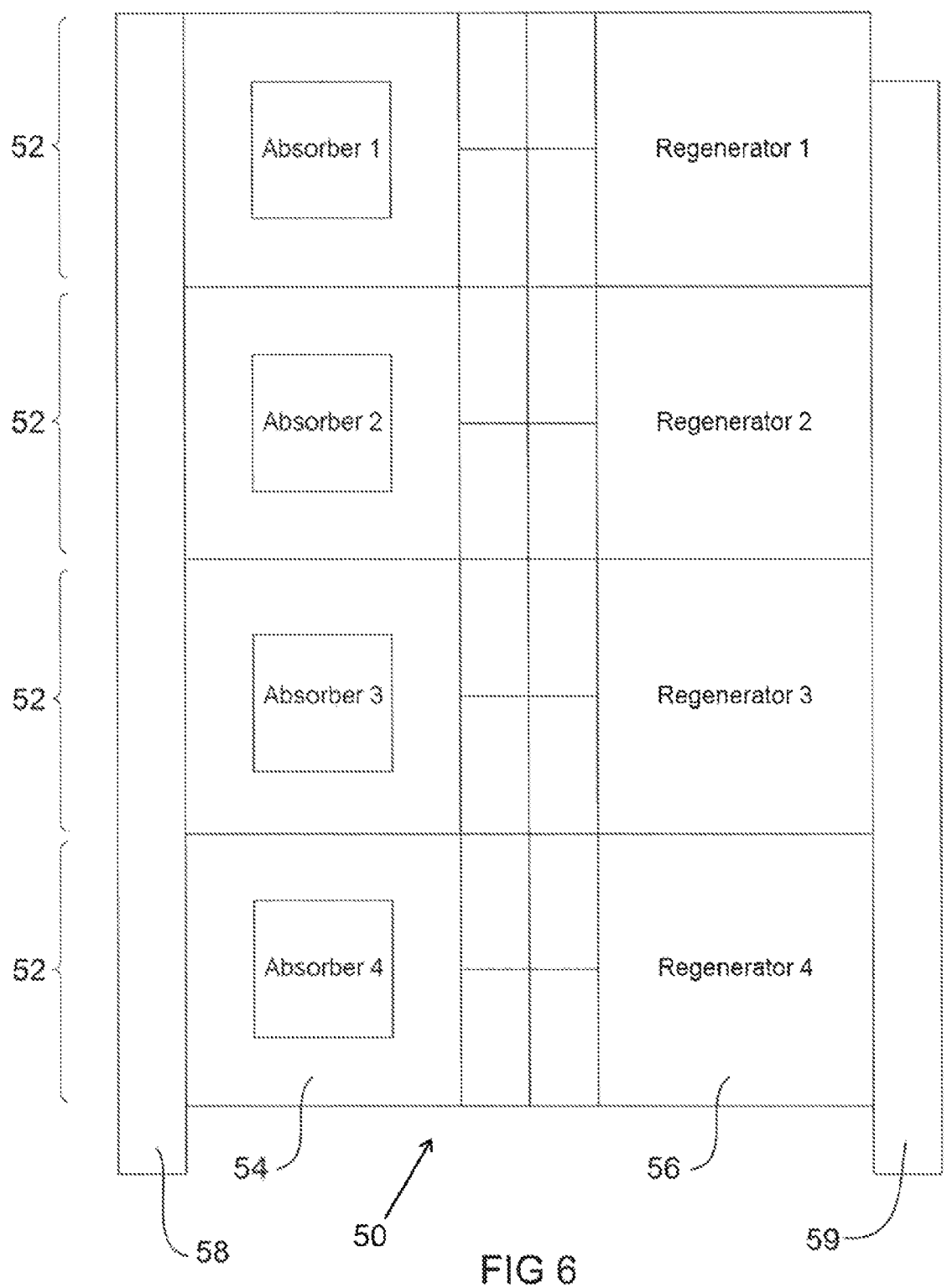
FIG. 6 is a schematic plan view of a modular gas scrubbing unit according to one preferred embodiment of the present invention.

FIG. 6 shows the arrangement of a modular unit 50 that may be formed from process vessels of a similar construction to those shown in FIGS. 2 to 5. However, it should be understood that this modular unit 50 could also be constructed from materials other than a cementitious material, for example steel or the like. The modular construction is intended to simplify construction of multiple units and therefore decrease overall construction and fabrication costs of the process vessels and overall gas absorption plant. The modular construction also facilitates accommodating turndown of the carbon capture process.

Like the process vessels V-002, V-003 and V-002A shown in FIGS. 2 to 5, each module 50 includes a number of flat-sided, square or rectangular process vessels 54, 56 for use with a gas absorption process such as is shown in FIG. 1. Each module 50 comprises a number of adjoining pairs 52 of absorber units 54 and regenerator units 56 arranged in banks. The illustrated module 50 includes four pairs 52 of absorber 54 and regenerator 56 units.

It will be appreciated that the absorber 54 and regenerator 56 units of each module 50 may be of any diameter and ultimately the gas flow rate that can be handled may be of any magnitude. However, each absorber 54 and regenerator 56 unit is preferably sized to treat a fraction of at least 1000 t/hr, and suitably greater than 2000 or 3000 t/hr of the gas. That fraction will depend on the number of absorber 54 and regenerator 56 units in that gas scrubbing apparatus. Similarly, each absorber 54 and regenerator 56 units are preferably sized to treat a fraction of at least 6000 t/hr liquid absorbent used in the gas scrubbing apparatus.

Like the vessels V-002, V-003 and V-002A described above, the inlet ports, the outlet ports, the fluid conduits connected to the inlet and outlet ports of the process vessel in the module 50 and other connection sections can be formed from and/or within the same cementitous material forming the shell or body of each unit 54, 56. In this modular form, certain fluid conduits of each unit 54, 56 are preferably configured to fluidly connect with the associated fluid conduits of an adjoining unit 54, 56 to form a common fluid conduit. The common flue gas inlet conduit 58 for the absorber units 54 and the common $CO_2$ product gas outlet conduit 59 are positioned on the outer walls of the modular unit 50.

Each inlet or outlet of each absorber unit 54 and regenerator unit 56 include a gate or butterfly valve to seal that inlet or outlet from the common fluid conduit. This allows each absorber unit 54 and regenerator unit 56 to be brought on/off-line to provide turndown to accommodate any gas feed variations that may result. For example, the combustion gas exhaust load from a coal-fired power station varies between peak electricity load periods and off-peak periods.

Each module 50 can include further process equipment in order to function as a solvent absorption system such as is illustrated in FIG. 1. For example, each module 50 can further include a scrubber, reboiler, heat exchangers, pumps or similar. Preferably, each module 50 includes the process vessels and process equipment shown in FIG. 1.

Any suitable heat exchanger could be used in the module 50. For the illustrated module 50, a countercurrent plate heat exchanger is preferably used.

Figure 8:
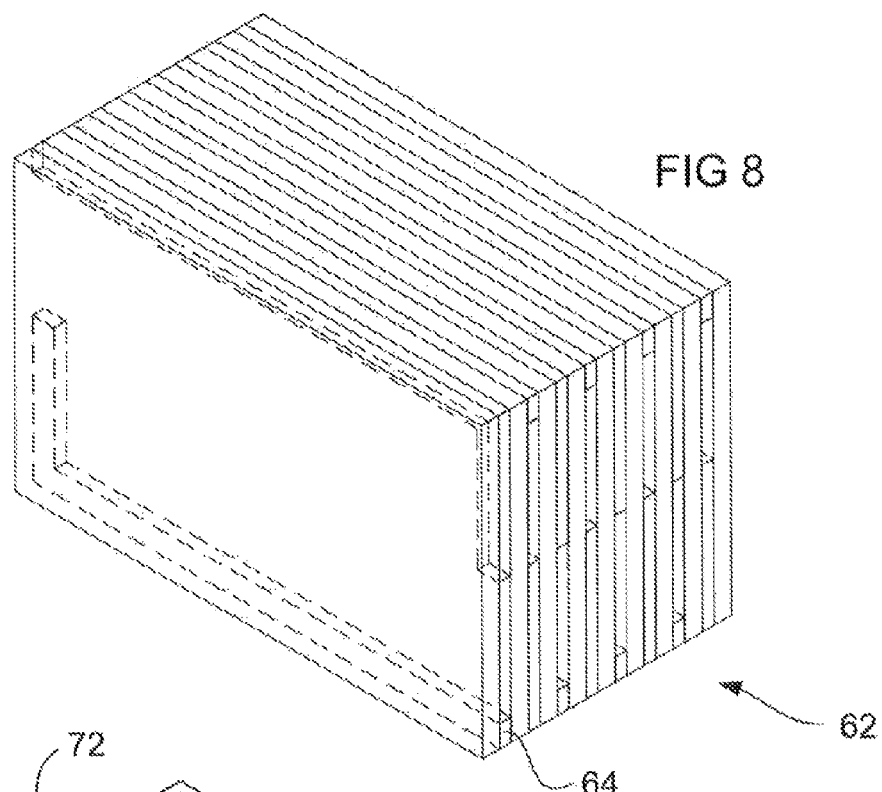
FIG. 8 is a perspective view of the plate and gasket detail of the plate heat exchanger shown in FIG. 7. While only nine plates are shown, it should be understood that the actual exchanger would have tens and possibly over a hundred plates.
Figure 7:
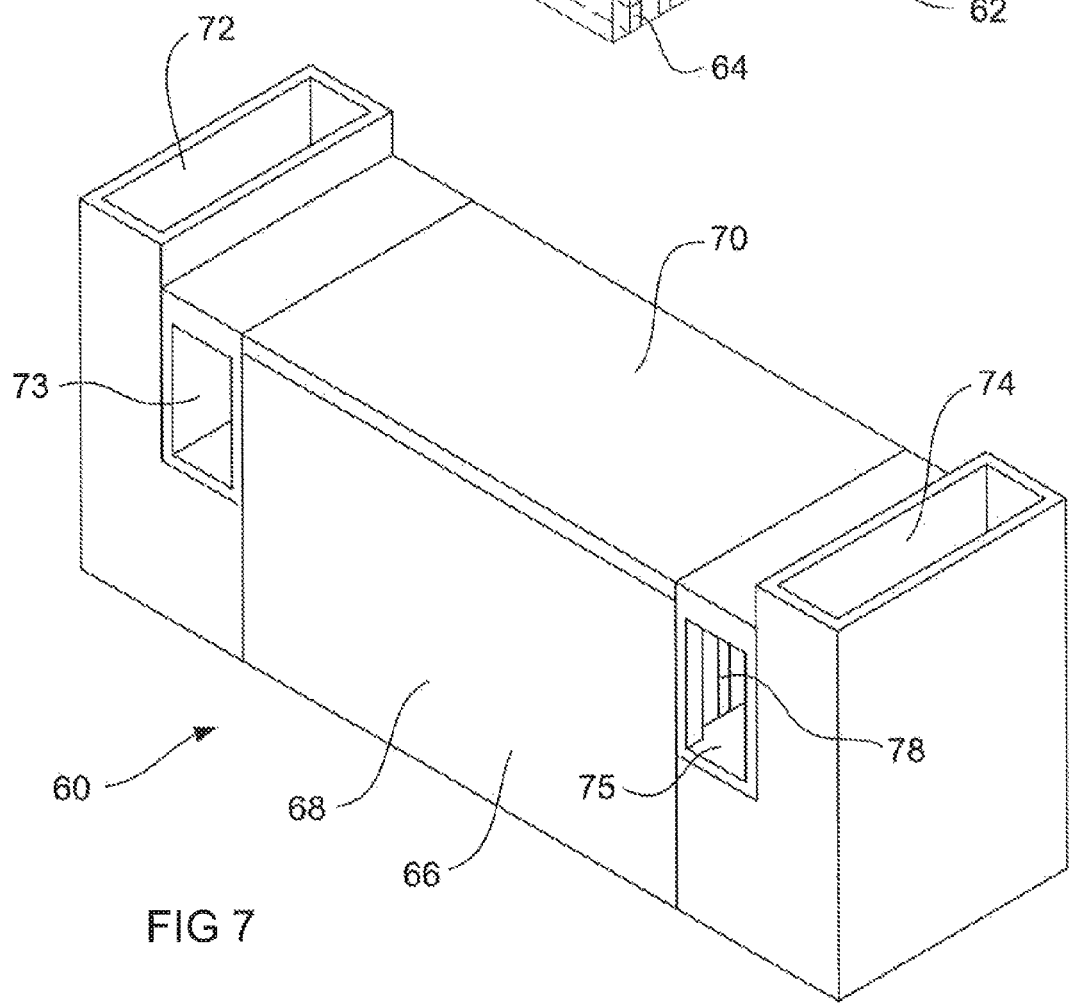
FIG. 7 is a perspective view of one plate heat exchanger unit according to a preferred embodiment of the present invention. The individual plates are not shown in this figure.

One preferred embodiment of a heat exchanger 60 that can be used with or in the module 50 is shown in FIGS. 7 and 8. This heat exchanger 60 configuration can be used for heat exchangers in the process shown in FIG. 1 that include liquid streams on both sides of the heat exchanger for example the HX-001 and HX-002. This configuration of heat exchanger 60 operates at a design pressure of around atmospheric pressure. This enables a simplistic yet robust design to be used for the heat exchanger plates 62 and the seals between the plates 64. It also facilitates the use of cheaper construction techniques similar to those described above in relation to the process vessels shown in FIGS. 2 to 5.

The illustrated heat exchanger 60 is a very large plate heat exchanger. The heat exchanger 60 includes a series of corrugated heat exchange plates 62 constructed from stainless steel, carbon steel or other materials. The corrugation of the plates 62 (not illustrated in FIGS. 7 and 8) are arranged on a 45° angle to the bottom lengthwise side of each plate (in a diagonal pattern). Furthermore, the corrugation of the plates 62 is alternatively orientated at 90° to the adjoining plate 62. This ensures that the corrugation maintains the spacing between each adjoining plate 62. In the illustrated embodiment, the plates 62 are alternatively arranged with the corrugation running diagonally (relative to the bottom lengthwise side), however, the corrugation can be arranged at any alternating angle such as horizontally and vertically or the like. As best shown in FIG. 8, the space between each adjoining plate 62 is sealed using elastomer gasket seals 64. These seals 64 create a single fluid pass space between each plate 52, although some leakage (and therefore a small amount of cross contamination) may occur. The plates 62 are cinched together using interconnecting tie rods or a similar fastening configuration (not illustrated).

As shown in FIG. 7, the plates 62 are housed in a vessel 66 constructed from a cementitious material such as concrete or a geopolymer (for example E-Crete™ produced by Geobond Pty Ltd in Melbourne, Australia). The vessel 66 is preferably located beneath the module 50 or relevant process vessels V-002 and/or V-003 depending on the form of the process used. In some cases, the vessel 66 may be located underground or in a pit. The vessel 66 includes a plate housing section 68 in which the plates 62 are located. The plate housing section 68 has a rectangular cross-section that conforms to the shape of the bank of plates 62. In other embodiments, one or both side walls of the plate housing section 68 include a removable plate to allow the exchanger plates 62 to be removed from one side. The plate housing section 68 has a removable top cover 70 to allow access and removal of the plates 62. In some forms, the top cover 70 can be sealed using a top seal (not shown) that may be a plate fabricated from elastomer, polymer, steel, or other material and held in place by its own weight, a fluid (e.g. water) or using other means. In other embodiments, one or both side walls of the plate housing section 66 include a removable plate to allow the exchanger plates 62 to be removed from one side. The exchanger plates 62 sit within complementary grooves formed in the base of the plate housing section 68. Fluids from the fluidly connected process streams enter and exit from inlet and outlet conduits 72, 73, 74, 75 formed in the sides of the heat exchanger 62. Like the process vessels described above, these inlet and outlet conduits 72, 73, 74, 75 are fabricated from a cementitious material such as concrete or a geopolymer (for example E-Crete™ produced by Geobond Pty Ltd in Melbourne, Australia) and are integrally formed with the walls of the vessel 66. At each inlet and outlet conduit 72, 73, 74, 75 the gaskets 64 between the plates form an opening from the conduit to the appropriate space between the plate 62 in the plate housing section 66 to allow fluid to flow between the plates 62.

The heat exchanger 62 is designed to feed solvent to both sides using gravity flow. The heat exchanger 62 is therefore typically situated beneath process vessels such as V-002, V-003 shown in FIG. 1. The illustrated heat exchanger 60 can be configured for use as a cross exchanger HX-002 in the process shown in FIG. 1. In this application, the rich solvent pump P-002 is preferably located downstream of the exchanger 60 (rather than upstream as illustrated) to allow the solvent to flow from both the absorber V-002 and regenerator V-003 under gravity. In this configuration, $CO_2$ rich solvent (a cool stream) from the absorber V-002 flows into the heat exchanger 60 through inlet 72 and exits via outlet 75. $CO_2$ lean solvent (a hot stream) from the regenerator V-003 flows into the heat exchanger 60 through inlet 74 and exits via outlet 73. The solvent from each outlet 73, 75 drains into respective pump wells (not shown) below the exchanger 60, such as a sunken pit (not shown) from where the solvent is pumped to either the absorber V-002 or regenerator V-003 using a banks of pumps (not shown) as discussed previously.

A similar heat exchanger 60 design may be used for the lean solvent cooler exchanger (HX-001). In this application, the lean solvent pump (P-003) would be located upstream of HX-001 rather than between HX-001 and HX-002 as is shown in FIG. 1. In this case, the cooling water would need to be supplied from a tank or similar at a sufficient height above the heat exchanger 60 to provide enough head for adequate cooling water flow. Where each of these heat exchangers HX-001 and HX-002 comprised this configuration in the process shown in FIG. 1, each exchanger HX-001 and HX-002 would need to be arranged such that the liquid head from the regenerator V-003 provided sufficient driving force for adequate flow of solvent through both exchangers HX-001 and HX-002.

It should be understood that this heat exchanger design 60 is not suitable for the condenser (HX-003) or reboiler (HX-004) shown in the process of FIG. 1 because the heat exchanger 62 is not gas tight and is designed to operate near atmospheric pressure.

While not illustrated, it should be appreciated that each module 50 can include at least one pump or pump bank connected to the conduits. As discussed above, the pump bank can comprise a bank of two or more pumps connected in parallel. Each pump can be individually controlled to operate to provide a required pump rate.

Those skilled in the art will appreciate that the invention described herein is susceptible to variations and modifications other than those specifically described. It is understood that the invention includes all such variations and modifications which fall within the spirit and scope of the present invention.

Throughout the description and claims of the specification the word "comprise" and variations of the word, such as "comprising" and "comprises", is not intended to exclude other additives, components, integers or steps.

We claim:

1. A gas scrubbing apparatus including:
   at least two modules, each module including at least one process vessel adapted for use in a gas scrubbing process in which a gas stream contacts a regenerable liquid absorption medium in an absorber, carbon dioxide being absorbed from the gas stream into the regenerable liquid absorption medium, the absorbed carbon dioxide being subsequently stripped from the regenerable liquid absorption medium in a regenerator to regenerate the liquid absorption medium for return to the absorber, each process vessel being selected from an absorber, a regenerator, a scrubber, a reboiler, a heat exchanger or a combination thereof, each process vessel having a top wall, a base wall, and at least three sidewalls formed from a cementitous material, each process vessel having inlet and outlet ports for fluid entering and leaving the process vessel when in use, formed within at least one of the top wall, base wall, or sidewall of each process vessel, wherein the sidewalls of each process vessel define a polygon shaped cross-section, wherein at least one side wall of a first process vessel in a first module can be connected or abutted to at least one side wall of a second process vessel in a second module, wherein each module includes at least two process vessels selected from an absorber, regenerator, gas scrubber, reboiler or heat exchanger, wherein each module includes at least one absorber and at least one regenerator, the gas scrubbing apparatus further including at least one heat exchanger in fluid communication with at least one of the at least one regenerator or the at least one absorber, the at least one heat exchanger being located under the base of the respective regenerator or absorber.

2. The gas scrubbing apparatus according to claim 1, wherein the sidewalls of each process vessel form a rectangular or square cross-section.

3. The gas scrubbing apparatus according to claim 1, wherein each process vessel comprises a vertically extending column.

4. The gas scrubbing apparatus according to claim 1, wherein the respective connected or abutting side wall of the first process vessel of the first module and second process vessel in the second module comprise a substantially planar surface.

5. The gas scrubbing apparatus according to claim 1, wherein the fluid conduits connected to the inlet and outlet ports of each process vessel are integrally formed with at least one of the top wall, base wall, or side wall of that process vessel.

6. The gas scrubbing apparatus according to claim 5, wherein the fluid conduits comprise vertically or horizontally hollow bodies formed with the respective top wall, base wall, or side wall of the process vessel.

7. The gas scrubbing apparatus according to claim 1, wherein the fluid conduits are positioned on the outer walls and/or through the respective connected or abutting side walls of the respective first and second process vessels.

8. The gas scrubbing apparatus according to claim 1, wherein certain fluid conduits of each module are configured to fluidly connect with the associated fluid conduits of an adjoining module to form a common fluid conduit.

9. The gas scrubbing apparatus according to claim 1, wherein at least one inlet or outlet of each module includes a sealing device to substantially close the at least one inlet or outlet.

10. The gas scrubbing apparatus according to claim 9, wherein the sealing device comprises a valve.

11. The gas scrubbing apparatus according to claim 1, wherein the interior of each process vessel is lined in fluid-tight manner with a moisture- and gas-impermeable lining.

12. The gas scrubbing apparatus according to claim 1, wherein each process vessel is formed from precast cementitous material sections or is cast-in-place from cementitous material.

13. The gas scrubbing apparatus according to claim 1, wherein the cementitous material is reinforced.

14. The gas scrubbing apparatus according to claim 1, wherein the sidewalls define at least one chamber within the process vessel that includes at least one of packing material, trays, or heat exchange elements.

15. A plant for removing carbon dioxide from a post combustion gas stream including a gas scrubbing apparatus according to claim 1.

* * * * *